3,387,014
PROCESS OF OXIDIZING ORGANO-ALUMINUM
COMPOUNDS
Emile Trebillon, Paris, and Georges Wetroff, Le Thillay,
France, assignors to Produits Chimiques Pechiney-Saint-
Gobain, Neuilly-sur-Seine, France
No Drawing. Filed Dec. 3, 1964, Ser. No. 415,807
Claims priority, application France, Dec. 4, 1963,
956,016
13 Claims. (Cl. 260—448)

ABSTRACT OF THE DISCLOSURE

The invention is concerned with the process for oxidation of alkyl aluminum compounds to provide for substantially total transformation of the organo-aluminum molecules into useful oxidized products which are free of AlR groups comprising reacting an oxygen containing gas with the aluminum alkyl compound until the oxidation proceeds to a product formed at least in part of compounds which become more difficult further to oxidize, as represented by the compound $AlR(OR)_2$ in which R is an aliphatic hydrocarbon radical containing from 2 to 30 carbon atoms and progressively adding at least one organo aluminum derivative having an average degree of oxidation which is less than that of the compound of the type $AlR(OR)_2$ to the first reaction product while continuing the introduction of oxygen containing gas.

---

This invention relates to the production of aluminum alcoholates by the process of oxidation of organo aluminum compounds and it relates to the hydrolysis of the alcoholate for the production of the corresponding alcohols in a high degree of purity.

It is well known that mild oxidation of aluminum alkyls in the presence of oxygen or an oxygen containing gas will result in the formation of aluminum alcoholates in accordance with the following equation:

$$2AlR_3 + 3O_2 \rightarrow 2Al(OR)_3$$

It is also well known that hydrolysis of the alcoholate will result in the formation of the corresponding alcohol in accordance with the following equation:

$$Al(OR)_3 + 3H_2O \rightarrow Al(OH)_3 + 3ROH$$

As used in the equation, R represents a hydrocarbon radical having an aliphatic group containing from 2 to 30 carbon atoms and preferably from 1 to 20 carbon atoms. The aliphatic group may be branched or straight chained, saturated or unsaturated, as represented by ethyl, propyl, butyl, isobutyl, pentyl, octyl, decyl, stearyl, oleyl, octanoic, vinyl, allyl etc. The R groups attached to the aluminum atom can be identical one with the other or they can differ one from the other, in which event one of the R groups can also be hydrogen.

The oxidation reaction can be carried out by bubbling air or a mixture of an inert gas and oxygen into contact with the organo aluminum compound, preferably with agitation. The affinity of oxygen differs for the three R groups, even when the R groups are identical, whereby the reaction proceeds in the sequence of forming the mono-, di-, tri-oxidized products, as represented by the following:

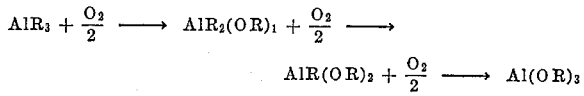

Whereas the oxidation reaction proceeds rapidly and without difficulty through the formation of the mono- and di-oxidized product, the absorption of the third atom of oxygen to form the corresponding trialcoholate is much more difficult and slow.

In the attempt to effect completion of the reaction for oxidation of the last radical to form the di- into the trialcoholate, several procedures have been proposed, such as extending the reaction time; making use of pure oxygen, increasing the reaction pressures up to as high as 70 kg./cm.$^2$ and increasing the temperature to as high as 125° C.; using a halogenated solvent; and carrying out the reaction in the presence of an aluminum trialcoholate $Al(OR)_3$.

These procedures are subject to a number of objections in that the reaction time becomes too long thus requiring the use of large and bulky reactors; or the presence of oxygen under compression in admixture with hydrocarbons at the conclusion of the reaction operates to expose the process to dangers of explosion. Even then, total oxidation is not achieved with corresponding reduction in yield.

It is an object of this invention to provide a method for achieving oxidation of all of the organic radicals bonded to the aluminum atom to form the corresponding aluminum trialcoholate by a reaction which can be carried out in a relatively short time, at a low temperature and low partial pressure of oxygen thereby to overcome many of the difficulties heretofore encountered, while minimizing the possibilities of explosion and providing a process which can be carried out on a commercial scale. It is a related object to provide a new and improved process for oxidation of aluminum trialkyls to produce aluminum trialcoholates from which realtively pure alcohols can be produced in a safe and efficient manner.

An important concept of this invention resides in the discovery that the completion of the oxidation of the more difficult oxidizable compounds such as $AlR(OR)_2$ to $Al(OR)_3$ can be effected in a rapid, safe and efficient manner by modification of the oxidation reaction to introduce an organo aluminum derivative having a degree of oxidation below that of the more difficult oxidizable compound and wherein the added organo aluminum derivative is also carried to an advanced stage of oxidation during the reaction thereby to provide for substantially total transformation of the organo aluminum molecules into useful oxidized products which are relatively free of >AlR groups.

In accordance with the practice of this invention, the oxidation of alkyl aluminum compounds is carried out in two phases, including a first phase in which the alkyl aluminum, alone or in solution, is partially oxidized until at least a major portion of alkyl aluminum is converted to the compound of the type $AlR(OR)_2$ which is the compound difficult to oxidize and a second phase in which at least one or more organo aluminum derivatives having an average degree of oxidation lower than the compound which is difficult to oxidize is introduced into the reaction medium with vigorous stirring and with continued introduction of oxygen. The organo metallic derivative introduced into the reaction medium is one in which less than all three of the valences of the aluminum are bound to oxygenated alkyl radicals and preferably in which less than two of the three valences are bound to an oxygenated alkyl radical, such as $Al_3$ or $AlR_2(OR)_1$.

During the first phase, an oxygen containing gas is brought into contact with the organo aluminum compound, which is either in its purified state or in a solution, as in a hydrocarbon solvent. The rate of oxidation is extremely rapid at the beginning of the reaction and it should therefore be controlled and regulated by limiting the amount of oxygen reacted in order to avoid combustion or overheating in the reaction medium. This can be achieved by limiting the partial pressure of oxygen in the the gas or by limiting the amount of oxygen containing gas supplied to the reaction thereby to control the rate of oxidation and to maintain temperature control.

The organo aluminum derivative introduced during the second phase is preferably identical to the organo aluminum compounds incompletely oxidized during the first phase. The addition of organo aluminum derivatives having aliphatic radicals of shorter length than the alkyl groups of the organo aluminum compounds incompletely reacted during the first phase or which have more easily oxidizable radicals enables the oxidation of the less reactive radicals to be completed more easily.

It will be understood that it is possible to make addition during the second phase of the oxidation reaction of at least two or three types of compounds $AlR_3$, $AlR_2(OR)_1$ and $AlR(OR)_2$, as long as the average degree of oxidation in the added organo aluminum derivative is below the degree of oxidation in the type of compound $AlR(OR)_2$ or the compound difficult to further oxidize in the first phase of the reaction. Thus a formula having a fractional values $AlR_{1.5}(OR)_{1.5}$ will symbolize a mixture of 50% molar $AlR(OR)_2$ and 50% molar $AlR_2(OR)_1$.

The organo aluminum derivative can be introduced during the second phase in proportions that may vary over a fairly wide range depending somewhat on the form of the useful product desired to be obtained. The proportion may be defined as the ratio T corresponding to the ratio of moles or organo aluminum compound in the first phase of oxidation reaction to the number of moles of organo aluminum derivative introduced during the second phase. A maximum of aluminum trialcoholate will be obtained with values of T ranging from 0.5 to 5. When the value of T falls below 0.5, excess oxidation results with the formation of acids, esters, aldehydes or other oxygenated fractions. When the value of T is above 5, oxidation becomes incomplete such that the product will contain unoxidized hydrocarbon radicals bonded to the aluminum.

In a preferred embodiment of the invention, air or a gas containing oxygen is introduced to the organo aluminum compound during the first phase until the oxygen is no longer rapidly absorbed, as evidenced by a decay in the amount of heat generated by the exothermic reaction. During the second phase, the organo aluminum derivative, preferably freshly prepared, is introduced while continuing the absorption of oxygen from air or oxygen containing gas.

The oxidation reaction is carried out at a temperature within the range of $-10°$ to $140°C$. but in order to effect efficient removal of the heat of reaction, it is desirable to operate at a temperature above $20°C$. during the first phase in which the temperature may sometimes rise to as high as $100°C$., as when the viscosity of the oxygenated derivative is high at lower temperature. Best results are secured when the temperature of the reaction medium is maintained within the range of $30°$ to $60°C$. The temperature conditions maintained during the second phase of the reaction will usually correspond to the conditions described for the first phase.

During the first phase of the reaction, it is desirable to make use of oxygen at a partial pressure which may be varied within the range of 0.1 to 1 atmosphere, depending somewhat on the amount of agitation and cooling and the nature or degree of oxidation of the organo aluminum compound in the reaction medium. On the other hand, during the second phase of the reaction, the partial pressure of oxygen is preferably maintained at about 0.5 atmosphere. In order to control the course of the reaction, the oxidation may be varied to provide for a partial pressure of oxygen within the range of 0.1 to 0.5 atmosphere and instances may arise where higher partial pressures within the range of 0.5 to 10 atmospheres may be desirable. During the second phase, it is important that a good contacting relationship be established between the liquid phase of the organo aluminum compound and the gaseous phase of oxygen. For this purpose, use should be made of means for vigorous agitation or other equivalent means. As a rule, the more effective stirring or agitation permits the use of lower partial pressures of oxygen in the gaseous phase.

The use of a solvent which is non-reactive with reference to the oxygen or the organo aluminum compounds is desirable for purposes of control and for dissipation of heat of reaction and to reduce the viscosity of the formed oxygenated organo aluminum compounds. As a solvent, use can be made of aliphatic saturated or unsaturated hydrocarbons having a carbon content within the range of $C_4$ to $C_{16}$; or use can be made of liquid cyclic hydrocarbons such as cyclohexane, benzene, toluene and the like. At the conclusion of the oxidation, the solvent is eliminated along with the volatile impurities formed during the oxidation reaction. Elimination can be made by such conventional means of separation as by distillation. Such distillation should be conducted at a temperature less than $200°C$. and preferably at a temperature within the range of $130°$ to $170°C$. to avoid decomposition. The temperature of distillation can be reduced still further when operating under subatmospheric pressures. Near the end of the distillation, it is desirable to reduce the pressures to within the range of 0.01 to 10 mm. of mercury while continuing to operate at temperatures heretofore described in order to effect more complete elimination of the less volatile impurities. Instead of making use of lower pressure, separation of the volatile impurities can be facilitated by the use of gases or vapors in the distillation.

The product is secured in the form of an alcoholate which can be employed in the preparation of alcohols of high purity by conventional hydrolysis.

In the absence of complete oxidation, as in the processes heretofore employed, the product containing $AlR(OR)_2$ would yield a number of alcohols and hydrocarbons, as illustrated by the following formulation:

$$AlR(OR)_2 + 3H_2O \rightarrow Al(OR)_3 + RH + 2ROH$$

In the instance where the molecular weight of the R radicals initially bound to the aluminum differ, the separation of such hydrocarbons from the alcohols by distillation becomes difficult, especially when the boiling point of the hydrocarbons is similar or interferes with the boiling point of certain alcohols. It then becomes necessary to employ other more complicated techniques for separation, such as by selective solvency.

An important advantage of the process of this invention resides in the possibility to regulate the operating conditions whereby incompletely oxidized derivatives containing >AlR groups are relatively non-existent at the conclusion of the oxidation reaction.

Although the invention has been described with reference to the preferential oxidation of organo aluminum molecules to $Al(OR)_3$, when the R groups are identical, the method is capable of use in obtaining organo aluminum compounds having the structure $$Al(OR_1)_1(OR_2)_1(OH_3)_1$$

where $R_1$, $R_2$ and $R_3$ represent alkyl radicals of the type previously described but differ one from the other from the standpoint of distribution and in which the number of C atoms may again vary from 2 to 30.

The following examples are given by way of illustration, but not by way of limitation, of this invention:

Example 1.—Experiment 1

380 grams of tris(2-methyl pentyl) aluminum are dissolved in 500 cm.³ of benzene and placed in a vessel having a stirrer to secure good contact between the liquid phase and the overlying gaseous phase.

Air, from which carbon dioxide and moisture has previously been removed by allowing the air to pass through potash and alumina absorbers, is introduced into the vessel. Introduction of the air is regulated, particularly at the beginning of the operation, in order to avoid too vigorous oxidation. The temperature is maintained between 20–25° C. by circulation of a cooling fluid through a jacket surrounding the reaction vessel. The first phase is completed when, by analysis of the input and exhaust gases, the rate of absorption of oxygen is reduced and the amount of heat released by the exothermic reaction falls off, usually after about 2 hours.

Thereafter, 180 grams of tris(2-methyl pentyl) aluminum are progressively introduced over a period of time of 1½ hours while the temperature is maintained within the range of 20–25° C. Evolution of heat is renewed with concurrent oxygen absorption but the introduction of air is regulated to provide for a partial pressure of oxygen in the reaction vessel of about 0.15 atmosphere. Ten minutes after having introduced the organo aluminum compound, the gaseous stream is stopped and the liquid product is placed in a distillation apparatus.

The solvent and the volatile impurities are removed by propressively heating up to a temperature of 130° C. under a reduced pressure of 20 mm. of mercury. The residue, which is the corresponding alcoholate, is hydrolyzed with 1 liter of a water solution of 5% caustic soda. After decantation, washing with water and drying the organic layer with potassium carbonate, 523 grams of 2-methyl pentanol are obtained, the hydroxyl number of which corresponds to a purity of 99.5%. The gaseous chromatographic analysis indicates only traces of 2-methyl pentane corresponding to a concentration less than 0.2% by weight.

Experiment 2

For purposes of comparison a test is carried out under identical conditions as in Experiment 1 but in which the total amount of tris(2-methyl pentyl) aluminum, or 560 grams, is introduced into the reaction vessel at the very start. The gas flow is maintained for the same total time of 3 hours and 40 minutes and the reaction is carried out at the same temperature of 20–25° C. The same thermal treatment of distillation is carried out under reduced pressure. The organic phase which is obtained after hydrolysis, washing and drying contains 12% by weight hydrocarbon, mainly 2-methyl pentane.

Experiment 3

By way of another comparative test, 380 grams of tris (2-methyl pentyl) aluminum to be oxidized are taken into solution with 500 cm.³ of benzene and introduced into a vessel provided with an agitator for securing good contact between the liquid phase and the overlying gaseous phase.

A current of air, previously freed from carbon dioxide and moisture, as in Experiment 1, is introduced into the vessel but introduction of air is regulated, particularly in the beginning of the reaction, in order to avoid too vigorous agitation. The temperature is maintained at 20–25° C. by circulation of a coolant fluid through a jacket surrounding the vessel. After 2 hours, the evolution of heat of reaction tends to fall off and after analysis of the inflowing and outflowing gases, it is noticed that the rate of absorption of oxygen is reduced.

From a reservoir equipped with a regulating valve, 220 grams of tris(2-methyl pentanolate) of aluminum in solution of 150 cm.³ of cyclohexane are introduced in the liquid phase into the vessel with stirring. The introduction is spread out over a period of time of 1½ hours at a temperature maintained at 20–25° C. under a partial pressure of oxygen of 0.15 atmosphere. Contrary to Experiment 1, only a negligible amount of heat is evolved and the amount of oxygen absorbed is also reduced. The work is stopped 10 minutes after having added the trialcoholate. The solvent and impurities are eliminated by distillation under pressure under the same conditions as in Experiment 1. After hydrolysis, decantation and drying in the same manner as in Experiment 1, a mixture containing 2-methyl pentanol is obtained which originates partly from tris(2-methyl pentyl) aluminum and partially originates from hydrolysis of the trialcoholate that is introduced in the second stage of the reaction. The resulting mixture contains 6% by weight of 2-methyl pentane which is indicative of incomplete oxidation of the tris(2-methyl pentyl) aluminum. The added trialcoholate obviously does not enhance the phenomenon of acceleration of the oxidation such as is experienced with the first experiment embodying the features of this invention.

Example 2.—Experiment 1

The organo aluminum substance to be oxidized is a mixture resulting from the fixation of butene on butyl aluminum and which has the following analysis:

| | Percent by weight |
|---|---|
| Tris(2-ethyl hexyl) aluminum | 70 |
| Tri n-butylaluminum | 22 |
| Tri dodecylaluminum | 8 |

220 grams of the above mixture and 150 cm.³ of cyclohexane are introduced into a reaction vessel similar to that used in Example 1. The oxidation is carried out at 25–30° C. with a gaseous mixture of nitrogen and oxygen progressively enriched with from 5 up to 50 molar percent of oxygen until cessation of the thermal effect. This first phase of separation of the dioxized organo aluminum derivative lasts about 1½ hours.

In another reaction vessel, identical to that used in Example 1, 220 grams of the same organo aluminum substance are oxidized by fixation resulting from the fixation of 11.5 grams of oxygen. This corresponds substantially to the formation of the corresponding dialkyl monoalkoxy aluminum derivatives.

In a second phase, the dialkyl monoalkoxy aluminum derivatives are progressively introduced into the reaction vessel containing the partially oxidized organo aluminum product in solution in cyclohexane. The addition is carried out over a period of 1½ hours while the temperature is maintained at 30° C. and in which the oxygen concentration in the effluent gas is maintained within the range of 45–50 molar percent, corresponding to a partial pressure of oxygen of 0.45 to 0.50 atmosphere.

After distilling off the cyclohexane and volatile impurities by heating up to 150° C. under 0.1 mm. of mercury, the alcoholate is obtained. It is hydrolyzed with 1 liter of water and the formed alcohols are steam-distilled off. 89 grams of butanol having a purity of 99.6% and 282 grams of 2-ethyl hexanol having a purity of 99.8% are obtained by distillation of the product. The dodecanol which is not steam-distillable, remains as a residue of the distillation. By extraction of the residue with ether and distillation of the extraction product, 29 grams of dodecanol having a purity of 99% are obtained. The proportion of hydrocarbons in the three fractions, determined by chromatography, is less than 0.2 molar percent. These results are obtained without eliminating fractions rich in hydrocarbons.

Experiment 2

By way of comparison, the conventional method of oxidation by progressively adding oxygen to 440 grams of the same organo aluminum substance, using the same temperatures, total time of reaction, partial pressure of oxygen in the gas and in the final treatment as in the first experiment of this Example 2, results in a mixture of hydrocarbons with alcohols containing 2% by weight of butane, 9% by weight of 3-methyl heptane and 3% by weight of heavy hydrocarbons in which branched dodecanes prevail. By distillation of this mixture it is difficult to obtain pure alcohols on account of the formation of azeotropes 3-methyl heptane-butanol and dodecanes-2 ethyl hexanol. The separation of such mixtures necessi-

Experiment 3

In another comparative test, in a first reaction phase identical to the first experiment of this Example 2, the preparation of the dioxidized organo aluminum derivative is carried out. In a second reaction phase, 250 grams of tris(2-ethyl hexanolate) of aluminum dissolved in 150 cm.³ of cyclohexane are progressively introduced into the reaction vessel containing the dioxidized organic compound in solution in cyclohexane. Addition is carried out over a period of 1½ hours while the temperature is maintained at 30° C. under a partial pressure of oxygen in the gas introduced of 0.45 to 0.50 atmosphere. After distilling off the solvent and the impurities, the alcoholate is hydrolyzed as in the first experiment of this Example 2.

The obtained mixture of alcohols, diluted by the 2-ethyl hexanol from the trialcoholate introduced, contains 1% by weight isobutane, 3% by weight 3-methyl heptane, and 2% by weight of heavy hydrocarbons. The presence of these hydrocarbons indicates that the addition of the trialcoholate of aluminum during the second phase of the reaction does not provide for total oxidation of the organo aluminum substance by comparison to the addition of mono-oxidized organo aluminum derivatives as in the first experiment of this Example 2, and which is representative of the practice of this invention.

Example 3

As in the method described in the first experiment of Example 2, the oxidation of the mixture of alkyl amuminum compounds, obtained by fixation of an average of 4 moles of ethylene on each of the carbon-aluminum bonds of triethyl-aluminum is carried out. It is known that products of this type have linear chains having a molecular weight distribution, on a statistical basis, around a maximum corresponding to 10 atoms of carbon. as in the first experiment of Example 2, the distillation of the solvent and of the impurities is completed at 150° C. but is carried out under a pressure of 0.01 mm. of mercury.

After hydrolysis with a 10% by weight aqueous solution of caustic soda, a mixture of primary alcohols with linear chains and an even number of atoms of carbon is obtained, distributed from between hexanol up to 1-octadecanol. Contrary to similar products obtained by the usual methods of oxidation, these alcohols contain only very slight amounts of hydrocarbons, such as an amount less than 0.5 to 1% by weight and are therefore easily separated by distillation.

It will be apparent from the foregoing that we have provided a new and improved process for the reaction to form the alcoholates of aluminum by oxidation of organo aluminum compounds and for the preparation of relatively pure alcohols by hydrolysis of the formed alcoholates.

It will be understood that changes may be made in the details of formulation and operation without departing from the spirit of the invention, especially as defined in the following claims.

We claim:

1. A process for the oxidation of alkyl aluminum compounds comprising a first reaction phase in which an oxygen containing gas is brought into reactive relationship with the alkyl aluminum compound until the oxidation proceeds to a product formed at least in part of compounds of the formula $AlR(OR)_2$ in which R is an aliphatic hydrocarbon radical containing from 2 to 30 carbon atoms which are compounds more difficult to oxidize and in which the first reaction phase is followed by a second reaction phase in which said $AlR(OR)_2$ is further oxidized to $Al(OR)_3$ which comprises progressively adding at least one organo aluminum derivative having an average degree of oxidation which is less than that of the compound of the type $AlR(OR)_2$ while continuing the introduction of oxygen containing gas to effect said further oxidation.

2. The process as claimed in claim 1 in which the first reaction phase is carried out under a state of agitation intimately to mix the oxygen with the reactant.

3. The process as claimed in claim 1 in which the organo aluminum derivative introduced during the second reaction phase has R groups bound to the aluminum identical to the R groups in the organo aluminum compound reacted in the first reaction phase.

4. The process as claimed in claim 1 in which not more than two of the three valences of the aluminum atom of the organo aluminum derivative introduced during the second reaction phase are bound to oxygenated alkyl radicals.

5. The process as claimed in claim 1 in which the organo aluminum derivative introduced during the second phase of the oxidation reaction is a mixture of at least two of the three organo aluminum derivatives selected from the group consisting of $AlR_3$, $AlR_2(OR)_1$ and $AlR(OR)_2$, the mean composition of which has an average degree of oxidation less than the degree of oxidation of the difficult to oxidize aluminum compound of the first reaction phase.

6. The process as claimed in claim 1 in which the oxidation reactions in the first and second reaction phases are carried out at a temperature within the range of 20° to 100° C.

7. The process as claimed in claim 1 in which the partial pressure of oxygen maintained during the second phase of the reaction is within the range of 0.1 to 0.5 atmosphere.

8. The process as claimed in claim 1 in which the ratio T between the number of moles of organo aluminum compound in the first reaction phase to the moles of organo aluminum derivative introduced during the second reaction phase is between 0.5 to 5.

9. The process as claimed in claim 1 in which the ratio T between the number of moles of organo aluminum compound of the first reaction phase to the organo aluminum derivative introduced during the second reaction phase is less than 0.5 with the resultant over-oxidation of the organo aluminum derivative to form the corresponding oxidized compounds selected from the group consisting of aldehyde, acid and esters.

10. The process as claimed in claim 1 in which the organo alumiuum compound in the first reaction phase is dissolved in a hydrocarbon solvent which is inert to oxygen and the organo aluminum compound.

11. The process as claimed in claim 1 in which the organo aluminum derivative introduced during the second reaction phase is dissolved in a liquid solvent system.

12. The process as claimed in claim 1 in which the first reaction phase is continued until the ratio of absorption of oxygen falls off.

13. The process as claimed in claim 1 in which the first reaction phase is continued until there is a noticeable reduction in the amount of heat generation during the exothermic reaction in the first reaction phase.

References Cited

UNITED STATES PATENTS

| | | | |
|---|---|---|---|
| 3,016,397 | 1/1962 | Walde | 260—448 |
| 3,066,162 | 2/1962 | Ziegler et al. | 260—448 |
| 3,070,616 | 12/1962 | Flanagan | 260—448 |
| 3,087,954 | 4/1963 | McClaflin | 260—448 |
| 3,270,065 | 8/1966 | Austin | 260—448 |
| 3,324,160 | 6/1967 | Wright | 260—448 |

TOBIAS E. LEVOW, *Primary Examiner.*

H. M. S. SNEED, *Assistant Examiner.*